(12) United States Patent
Gabrielson (10) Patent No.: US 7,865,396 B1
(45) Date of Patent: Jan. 4, 2011

(54) MANAGING STORAGE IN A NETWORKED ENVIRONMENT

(75) Inventor: Jacob Gabrielson, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 1223 days.

(21) Appl. No.: 11/479,936

(22) Filed: Jun. 30, 2006

(51) Int. Cl.
*G06Q 30/00* (2006.01)
(52) U.S. Cl. .................................................. 705/14.49
(58) Field of Classification Search ............... 705/14.49
See application file for complete search history.

(56) References Cited

U.S. PATENT DOCUMENTS

| | | | |
|---|---|---|---|
| 4,789,293 A * | 12/1988 | Hashimoto et al. | 414/273 |
| 4,792,270 A * | 12/1988 | Yoshida | 414/273 |
| 4,941,714 A * | 7/1990 | Seymour | 312/31 |
| 6,266,649 B1 * | 7/2001 | Linden et al. | 705/26 |
| 6,532,452 B1 * | 3/2003 | Pintsov et al. | 705/401 |
| 6,587,031 B1 * | 7/2003 | Daugherty et al. | 340/5.31 |
| 2002/0019783 A1 * | 2/2002 | Chol | 705/26 |
| 2002/0029152 A1 * | 3/2002 | Lee et al. | 705/1 |
| 2003/0101072 A1 * | 5/2003 | Dick et al. | 705/1 |
| 2004/0117307 A1 * | 6/2004 | Carlis et al. | 705/41 |
| 2007/0214365 A1 * | 9/2007 | Cornett et al. | 713/183 |

OTHER PUBLICATIONS

Roberton, Paul, "One Gem of a Business," Regina Sun, Final Edition, Regina, Sask., Oct. 10, 2004, p. 52.*

* cited by examiner

*Primary Examiner*—John W Hayes
*Assistant Examiner*—Nathan Erb
(74) *Attorney, Agent, or Firm*—Christensen O'Connor Johnson Kindness PLLC (57) ABSTRACT

A system and method for managing the storage of items in conjunction with a networked environment. A client computing device generates requests for the storage of items. A storage service processes the requests for the storage of items and associates a unique user ID corresponding to a user with a unique storage ID corresponding to an item to be stored. Upon receipt of the item, a user is presented with an identification of all items stored at a secured storage location and a list of selectable services corresponding to items stored at the secured storage location.

38 Claims, 8 Drawing Sheets

MANAGING STORAGE IN A NETWORKED ENVIRONMENT

BACKGROUND

People commonly used safety deposit boxes and safes to store a variety of items in a remote location. Typically, safety deposit box rental is among the services offered by banks and other secure facilities to customers that need a private and secure place for storing items such as documents, e.g., passports, wills deeds, etc.; jewelry; financial goods (e.g., cash, precious metals, investment certificates etc.), memorabilia, e.g., photographs, programs, newspaper articles, and the like. The process of obtaining a safety deposit box generally involves selecting a service provider that offers a safety deposit box rental service, determining the necessary amount of storage required, and entering into a service contract (for example, a lease agreement). To use a safety deposit box, a customer generally travels to the physical location of the safety deposit box, places selected items in the safety deposit box, locks the box, and keeps the key for future access to the safety deposit box. Generally, the service provider has no knowledge of or access to the contents of the safety deposit box.

The conventional rental of storage space and/or requirement to physically access a storage location to place items into storage can become a time consuming and inconvenient process. Additionally, customers are generally responsible for ensuring that keys to the safety deposit box are maintained in a secure place. Furthermore, remote access to the contents or list of items in the box is typically not possible. For example, customers cannot typically inventory, view or otherwise remotely access any of the items stored in a safety deposit box, especially if the items are physically remote from the customer. Furthermore, access to the contents of the box can often be limited to the business hours of the service provider.

In a further aspect, services related to the stored items in the safety deposit box can be limited. Typically, a customer has to physically go to the box, open the box with the key, access the item for the performance of the related service. For example, to copy a document, such as a passport, a customer generally has to physically remove the document from the safety deposit box, take the document to a copy machine, and then return the document to the safety deposit box. Additionally, because the service provider may not be aware of the nature of the stored items, the service provider cannot suggest or offer enhanced service specifically related to aspects of the stored items.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method for managing the storage of items in conjunction with a networked environment. A client computing device generates requests for the storage of items. A storage services processes the requests for the storage of items and associates a unique user id corresponding to a user and a unique storage id corresponding to an item to be stored. Upon receipt of the item, a user is presented with an identification of all items stored at a secured storage location and a list of selectable services corresponding to items stored at the secured storage location.

In accordance with an aspect of the present invention, a system for managing the storage of one or more items is provided. The system includes one or more one or more client devices for transmitting a request for storage of an item. The system also includes a storage service for processing the request for storage of an item from the client device. The processing of the request by the storage service includes the association of a unique user id corresponding with a user with a unique storage code corresponding to a stored item. The storage service further generates a set of selectable services associated with items delivered to a secured storage site associated with the storage service.

In accordance with another aspect of the present invention, a computer-readable medium having computer executable modules for managing storage is provided. The computer executable modules include a user interface module for providing a user interface to a user of a client computing device for providing and receiving storage-related information including selectable services related to an item delivered for storage with a secured storage site. The computer executable modules also include a network interface module operable to send and receive storage-related information over a computer network. The computer executable modules further include a data store interface module operable to use a data store to store and retrieve information about the item associated with the user. The computer executable modules also include a storage information management module operable to associate a unique user ID with a unique storage code. The unique user ID being associated with the user and the unique storage code being associated with the item delivered for storage with a secured storage site.

In accordance with a further aspect of the present invention, a computer-assisted method for managing storage is provided. A storage service obtains obtaining a storage request from a client computing device. In response to the obtaining a storage request, the storage service obtains a unique user ID associated with a user of the client computing device, obtains a unique storage code used to identify an item associated with the user, and associates the unique user ID with the unique storage code. The storage service then provides selectable services for the item.

In accordance with yet another aspect of the present invention, a computer-accessible medium having instructions encoded thereon that are used for storage is provided. The instructions, when executed by a computing device, cause the computing device to obtain a unique user ID associated with a user in response to a storage request made by the user. The instructions further cause the computing device to obtain a unique storage code used to identify an item associated with the user. Still further, the instructions cause the computing device to associate the unique user ID with the unique storage code and provide selectable services for the item. Thereafter, the computing device obtains a selection of one or more selectable services for the item. The instructions then cause the computing device to initiate the process of the selected services for the item.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the invention relates to a system and method for managing the storage of times in conjunction with a communication. More specifically, the invention relates to various aspects of the management of storage of items including the initial storage of items selected for storage, the management of current stored items, and/or the management of services associated with stored items. Although specific system configurations, user interfaces, and flow diagrams are illustrated, it should be understood that the examples provided are not exhaustive and do not limit the present invention to precise forms and embodiments disclosed. Persons skilled in the field of computer programming will recognize that components and process elements described herein may be interchangeable with other components or elements, or combinations of components or elements, and still achieve the benefits and advantages of the invention.

Prior to discussing the details of the invention, it is recognized by those skilled in the art that the following description is presented largely in terms of logic operations that may be performed by conventional computer components. These computer components, which may be grouped in a single location or distributed over a wide area, generally include computer processors, memory storage devices, display devices, input devices, etc. In distributed computer systems, the computer components are accessible to each other via communication links. Additionally, although numerous specific details are set forth in order to provide a thorough understanding of the invention, it will be apparent to one skilled in the art that the invention may be practiced without some or all of these specific details. In other instances, well-known process elements have not been described in detail in order not to unnecessarily obscure the invention.

Figure 1A:
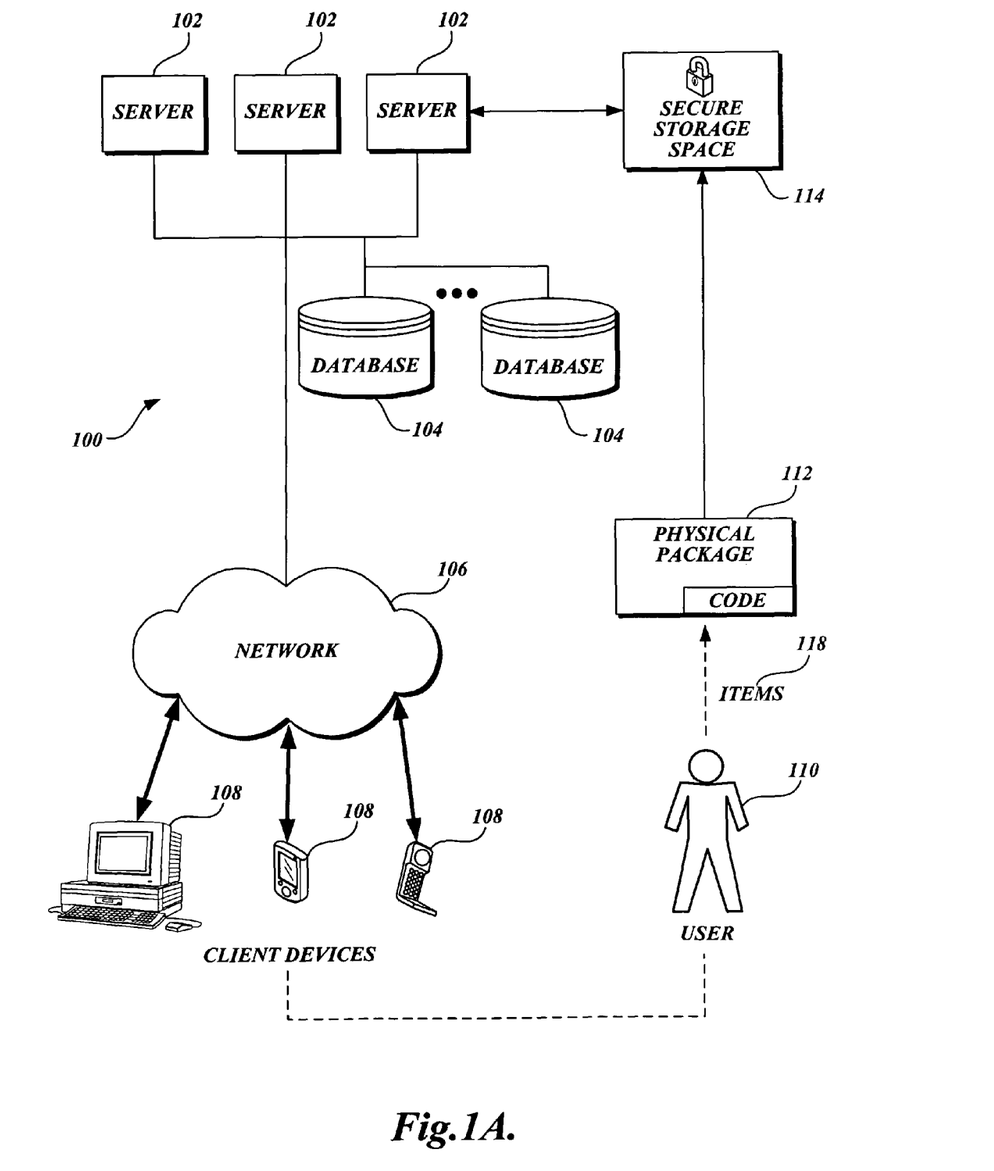
FIG. 1A is a pictorial diagram illustrating a sample operating environment suitable for providing secure storage of items.

With regard to the operating environment of the invention, while there are numerous environments in which secure storage of items may be implemented, FIG. 1A illustrates a sample operating environment for providing secure storage of items. The operating environment shown in FIG. 1A includes one or more client devices 108 by which a user 110 can request storage of one or more items 118 in a secure storage space 114. The client devices 108 communicate with one or more server computing devices 102 via a communication network 106, such as the Internet. Although the present description may refer to the Internet, persons skilled in the art will recognize that other network environments that include local or wide area networks and/or wired or wireless networks may also be suitable. Further, the client devices 108 and/or service computing devices are typically computing devices including a variety of forms or configurations such as, but not limited to, personal computers, server computers, personal digital assistants (PDA), mobile phones, hybrid PDA/mobile phones, electronic readers, workstations, laptop computers, tablet computers, set-top boxes, etc.

As will be described below, the servers 102 manage the secure storage of items 118 in the secure storage space 114 as requested by the user 110 using a client device 108. For example, in one embodiment, the items 118 include physical items, such as valuables, documents, etc. In such an embodiment, the user 110 submits a storage request to the servers 102, which process the request and send the user a physical package 112 for shipping the items 118 to the secure storage space managed by the servers 102. The physical package 112 may have a unique storage coded assigned by the server 102C or otherwise to be inputted by the user 110B. When the physical package is received at the secure storage space 114A, a unique user ID associated with the user 110, is associated with the unique storage code associated with items 118. The item 118 may be inspected, scanned, etc. to inventory the item and/or collect additional information about the item. The server 102 stores information about the user 110 and the items 118 in one or more databases 104. In one exemplary embodiment, the databases 104 are attached to the server computing device 102. Alternatively, the databases 104 are located remotely, or otherwise distributed, with respect to the servers 102.

Once the physical items are in the secured storage space 114, a user 110 connects to the servers 102 using the client device 108 to access information relating to a previously stored item 118. As will be described in greater detail below, the user can view or search for the items 118 currently stored in the secured storage space 114. Additionally, the server 102 provides selectable services relating to items 118. The user 110 may select one or more of the services to be applied to item 118 by the service provider providing servers 102. The services to be applied to the item 118 may be offered upon receipt of the item at the secured storage space 114 or at various times during the storage of the item.

Figure 1B:
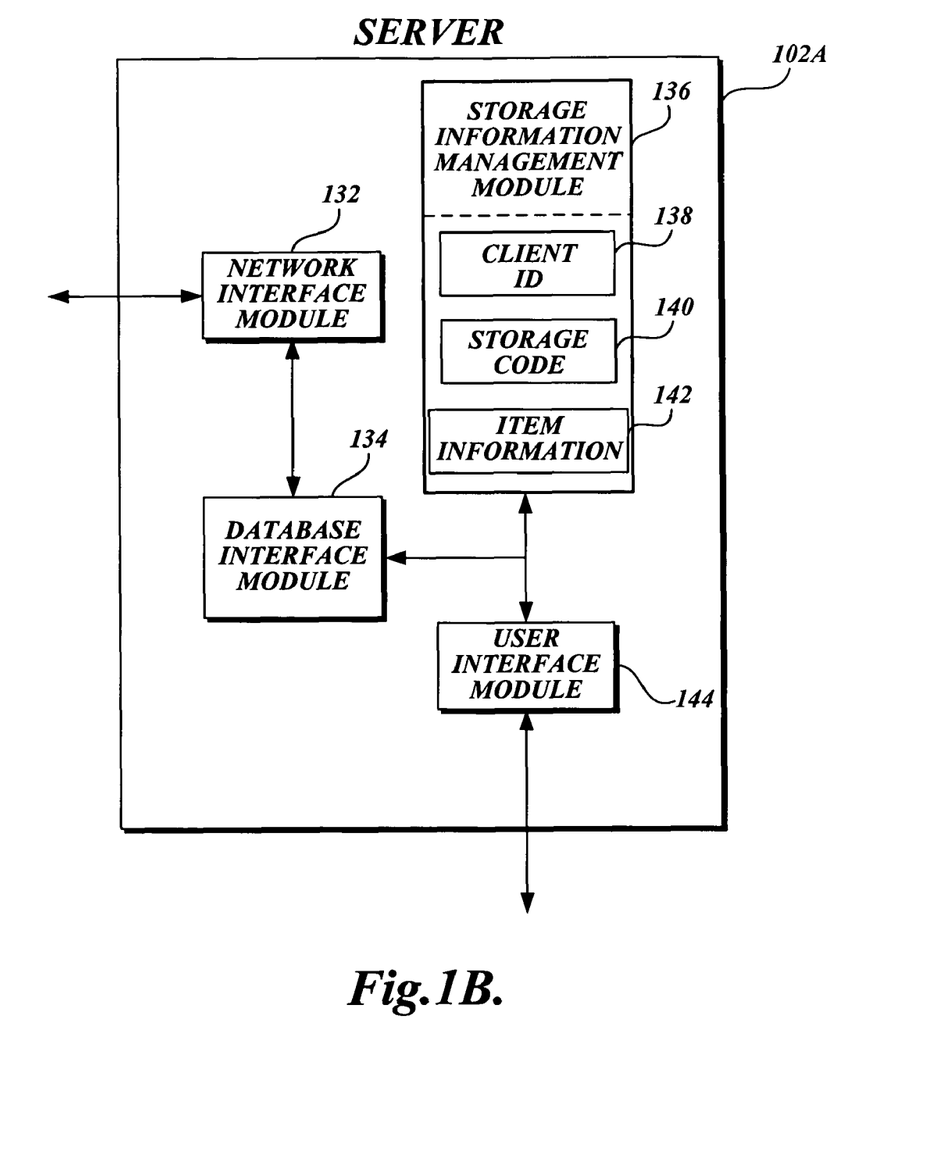
FIG. 1B is a block diagram illustrating sample components of a server computing device suitable for managing the secure storage of items within the operating environment shown in FIG. 1A.

FIG. 1B is a block diagram illustrative of various components of a server computing device 102A ("server 102A") for storage management. The server 102A can include a network interface module 132 provides connectivity to the client computing devices 108 via the computer network 106. In one exemplary embodiment, the network interface module 132 is a software component. In another exemplary embodiment, the network interface module 132 is a hardware component. In yet another exemplary embodiment, the network interface module 132 is a combination of hardware and software components. The server 102A includes a database interface module 134 used for communicating with the database 104. The database interface module 134 can be a software component that connects to a relational database 104 and executes database query language instructions (SQL instructions). In another exemplary embodiment, the database interface module 134 is a software component that writes data to a computer file in binary or text formats.

With continued reference to FIG. 1B, the server 102A further includes a storage information management module 136, which is used to process information about the user 110 and items 118. As will be explained in greater detail below, the storage information management module 136 can maintain information related to the management of stored items, including, but not limited to, user IDs 138, storage codes 140, and item information 142. In one aspect, user IDs 138 can be associated with storage codes 140. Item information 142 includes information about storage dates, storage location, and additional services selected by user 110 to be performed on item 118. The server 102A also includes a user interface module 144 which provides user interface to user 110 for requesting storage and status information for items 118. In one exemplary embodiment, the user interface module 144 provides a Web interface to user 110 which is downloaded to the client device 108 through computer network 106. In another exemplary embodiment, the user interface module 144 downloads data or executable code to the client device 108 to be used in an application program running on the client device 108 which provides the user interface to user 110 to enter data and view information about items 118.

Figure 1C:
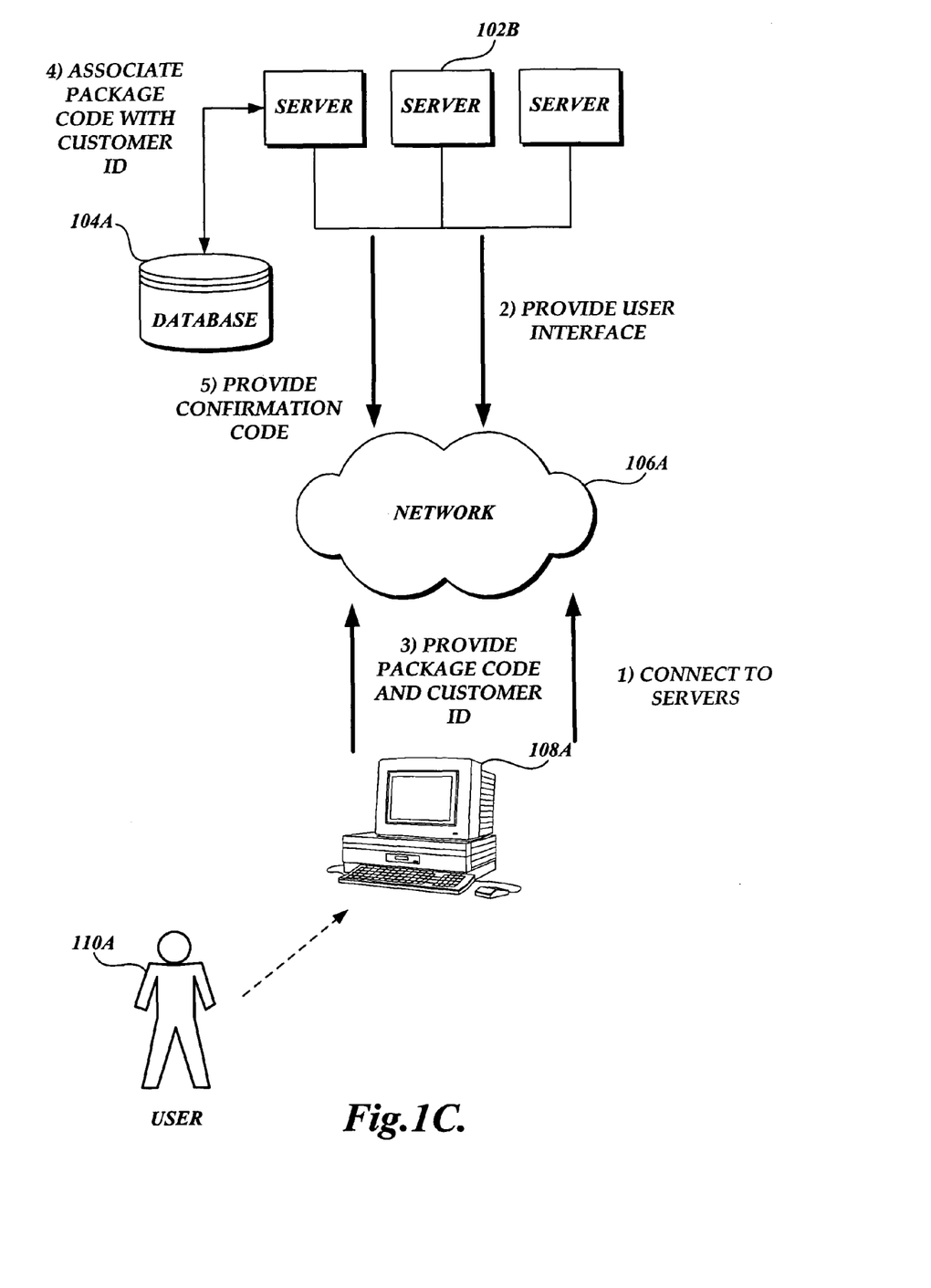
FIG. 1C is a pictorial diagram illustrating initiation of item storage in the operating environment shown in FIG. 1A.

FIG. 1C is the block diagram of the operating environment of FIG. 1A illustrating the management of storage of an item over the communication network. In accordance with an illustrative embodiment, a user 110A uses client device 108A to connect to servers 102B via computer network 106A. The server 102B provides a user interface to user 110A, which the user manipulates to identify various items for storage. Thereafter, the server 102B associates a unique storage code with a unique customer ID (either user generated or server generated) and stores the association in database 104A.

Figure 1D:
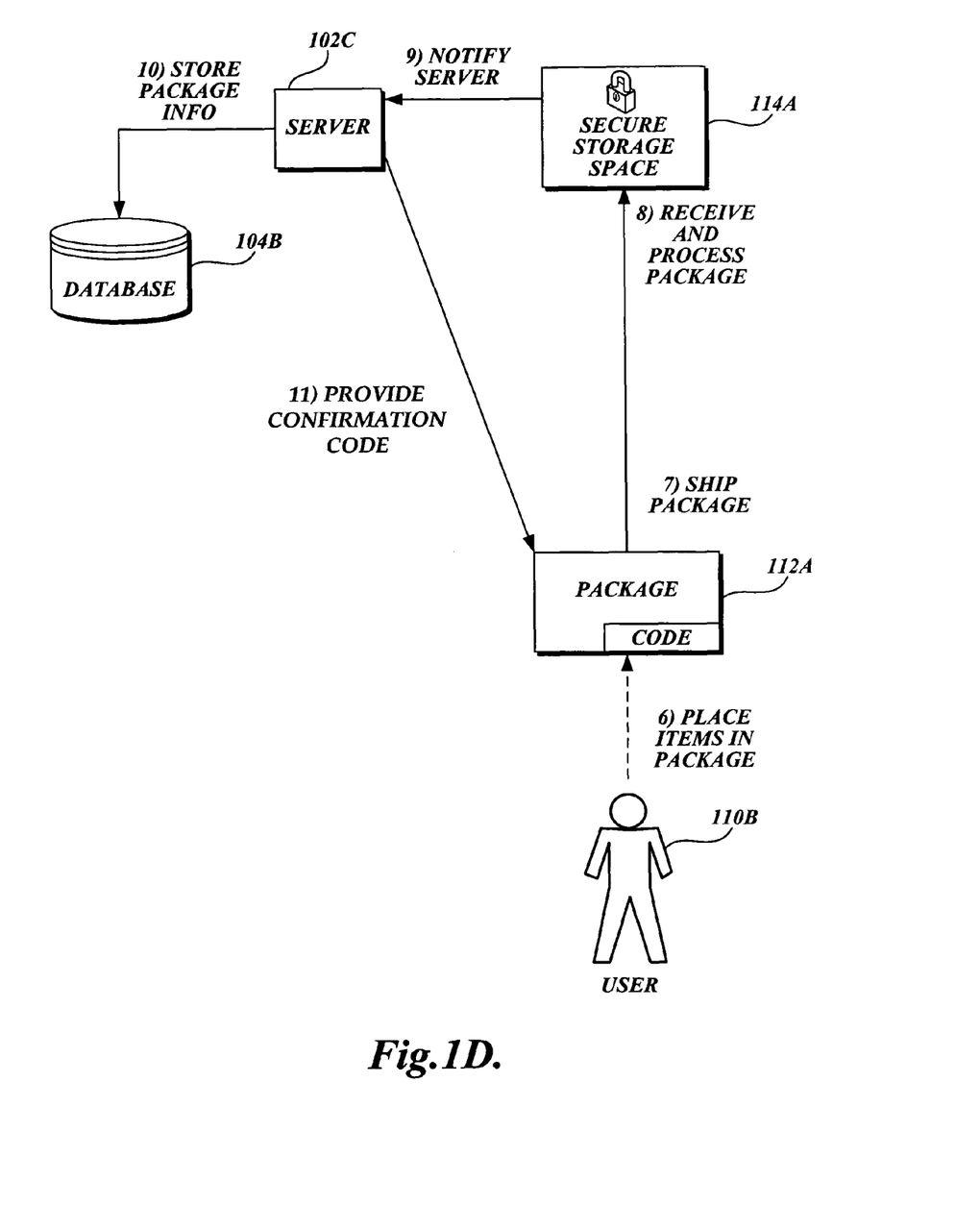
FIG. 1D is a block diagram illustrating completion of item storage in the operating environment shown in FIG. 1A.

FIG. 1D is a block diagram of the operating environment of FIG. 1A illustrating the further processing of an item for storage. Upon completion of the association of a storage code with an item (FIG. 1C), a user 110B uses the storage confirmation code to store items 118 at the secure storage space 114A. In one exemplary embodiment where the items 118 are physical items, the user 110B places items 118 in a pre-coded storage package 112A and ships the storage package 112A to the secure storage space 114A. Alternatively, the items may be shipped by third party service providers or otherwise obtained by a service provider associated with the secured storage space 114A.

The secure storage space 114A obtains the pre-coded package 112A and records information about the pre-coded package 112A. In one embodiment, the pre-coded package 112A may be opened to review and remove the item for storage. In another embodiment, the pre-coded package 112A may remain sealed/packaged and the item 118 will not be removed. The secure storage space 114A notifies server 102C of the receipt of pre-coded package 112A. The server 102C collects information about pre-coded package 112A from secure storage space 114A and stores the information in database 104B. In one exemplary embodiment, server 102C is located at the site of secure storage space 114A. In another exemplary embodiment, the server 102C is located remotely with respect to the secure storage space 114A and is connected to the secure storage space 114A via a computer network. Additionally, the server 102B provides a confirmation code for storage of items 118 to user 110A. The user 110A subsequently uses the confirmation code to manage the stored items 118 or select services may be provided relating to the stored items.

Figure 2:
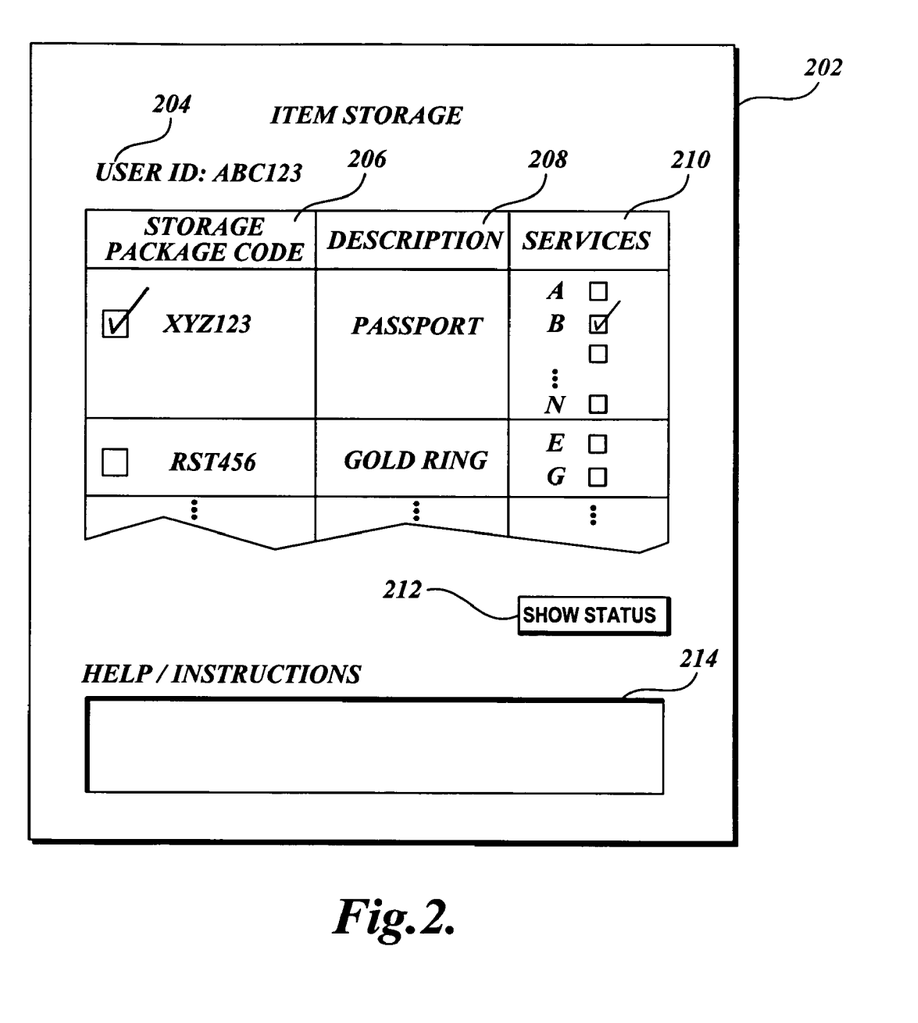
FIG. 2 is a pictorial diagram of a sample user interface generated on a computing device for displaying information regarding storage of an item.

FIG. 2 is a block diagram illustrating a user interface 202 generated by a client computing device 108 for management of stored items. As noted above, the user interface 202 is provided by the server 102 and generated locally by client device 108. The user interface 202 includes a user ID field 204 to be associated with items 118 to be stored at the secure storage space 114 for a specified user. In one exemplary embodiment, a column 206 for storage package codes and a column 208 for corresponding descriptions are provided to identify the various stored items. The user interface 202 also includes a portion 210 identifying a set of selectable services that can be provided or otherwise associated with the stored items. A graphic user interface (GUI) component, such as a button 212, is provided to request status and other information about previously stored items 118.

In one exemplary embodiment, all previously stored package codes 206 are listed in a table that are selectable by user 110. Once selected by a user 110, for example, using a check box, information about the selected packages is displayed to the user 110. Additionally, a text box 214 is used for communication with the user. For example, instructions are provided to the user 110 regarding shipping of items 118 or to provide additional comments and information about the storage of items 118. The screen display 200 can be accessed by the user 110 upon receipt of the items 118 for storage or throughout the storage of the items. Those skilled in the art will appreciate that the user interface 202 may be implemented in many different ways without departing from the spirit of the invention.

Figure 3:
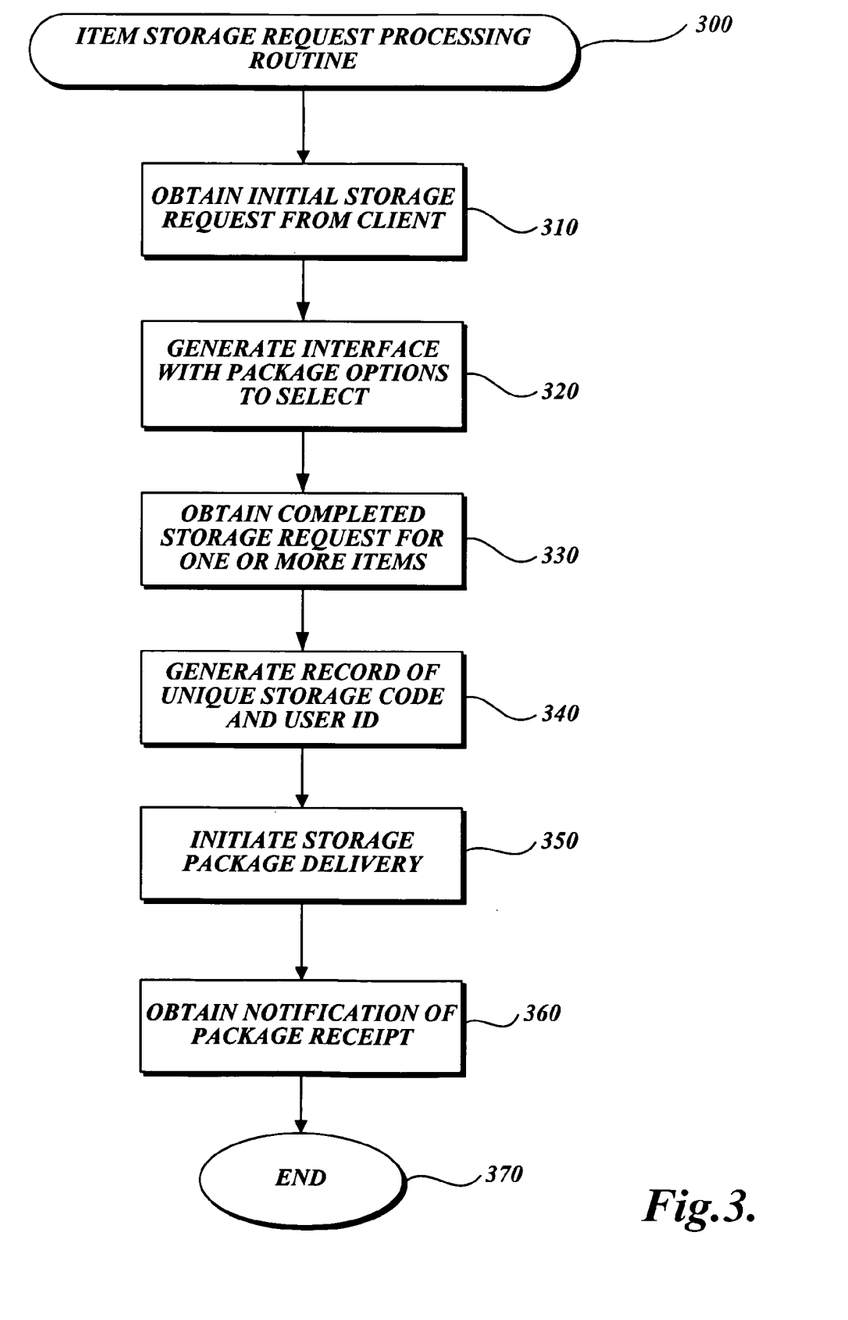
FIG. 3 is a flow diagram of a sample storage request processing routine implanted by a server computer for processing a request for storing one or more items in a storage space.
Figure 4:
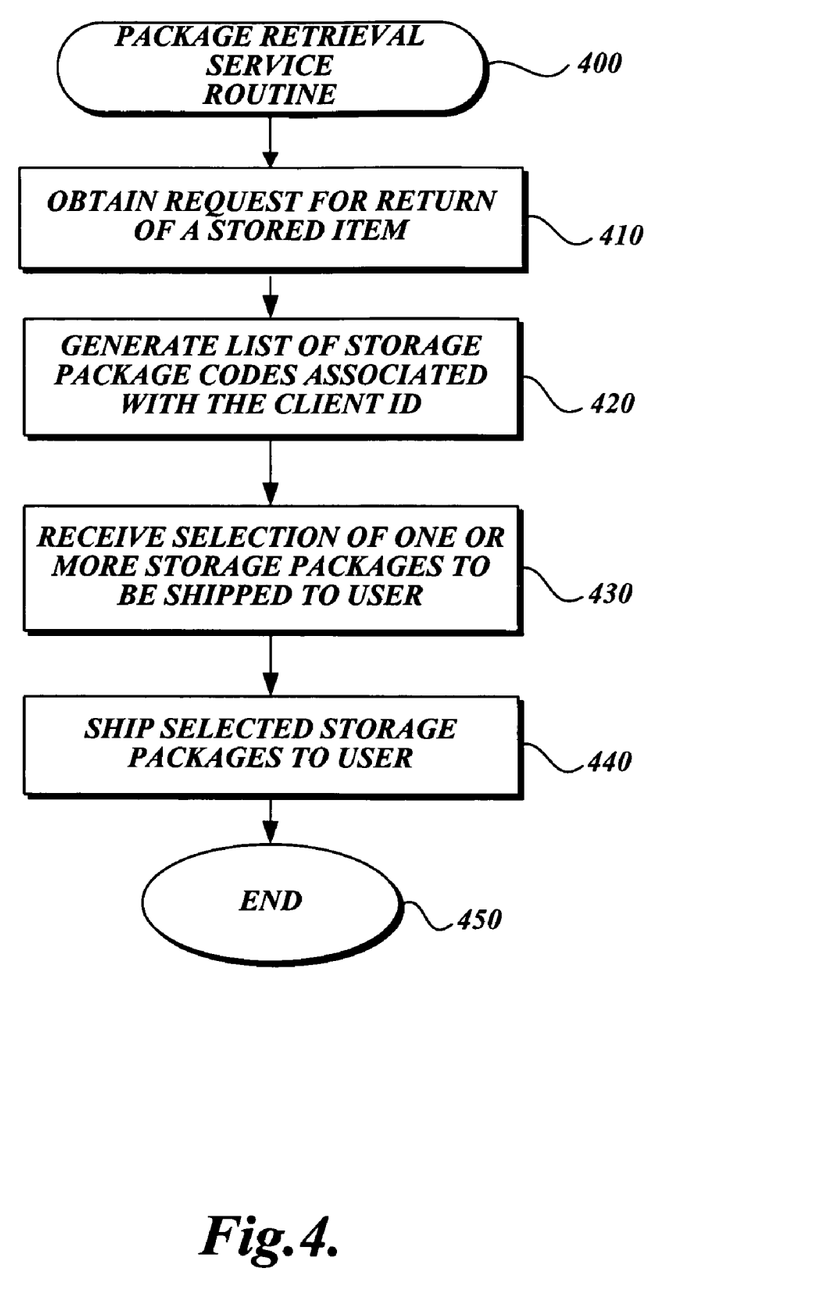
FIG. 4 is a flow diagram of a sample routine for returning items in a storage space.
Figure 5:
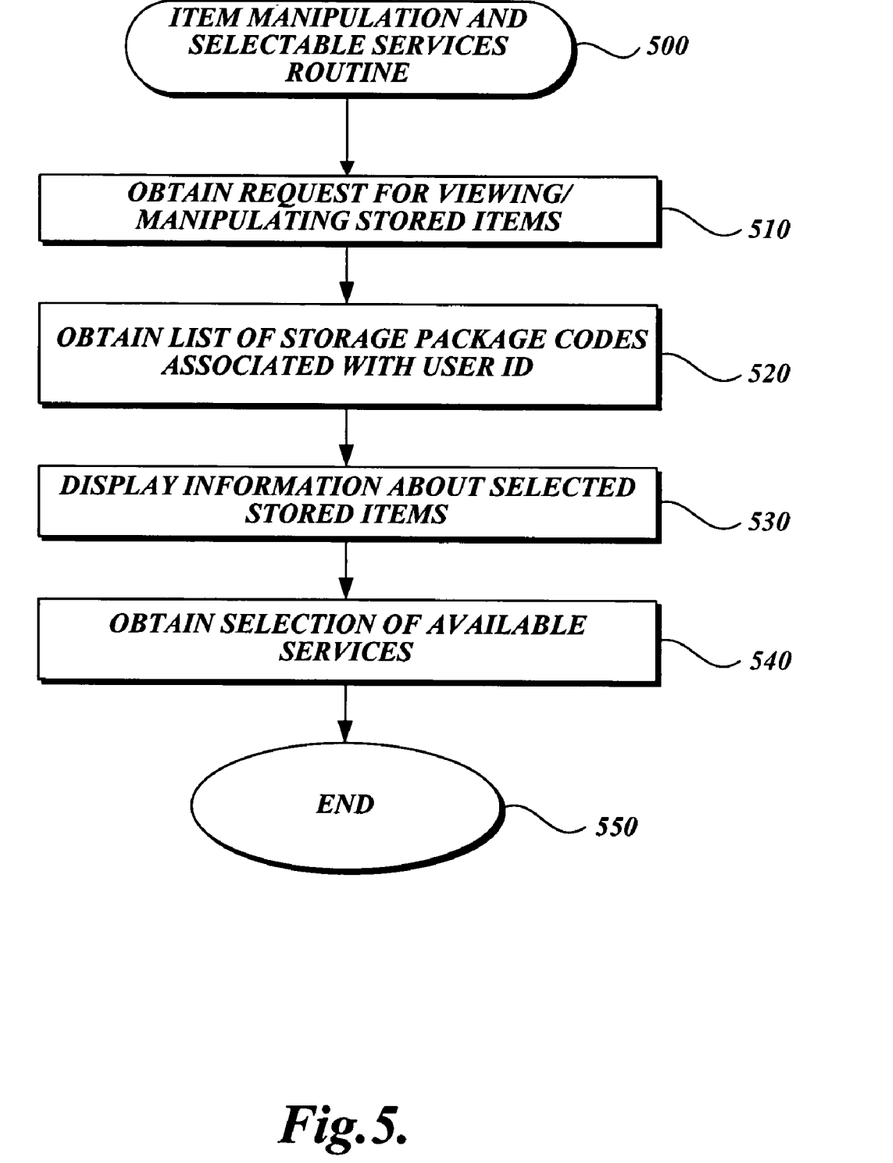
FIG. 5 is a flow diagram of a sample routine for viewing and selecting value-added services for items in a storage space.

Turning now to FIGS. 3-5, a set of illustrative routines for the management of stored items will be described. With reference to FIG. 3 a flow diagram of an item storage request processing routine 300 implemented by a server 102 corresponding to a storage management service provided over a network will be described. At block 310, the network interface module 132 of the server 102 obtains an initial storage request from the client device 108. At block 320, the user interface module server 110 generates a user interface including information about storage package options. The user interface is presented to the user 110 via a Web page or a software application running on the client device 108, as discussed above.

At block 330, the network interface module 132 obtains a completed storage request for one or more items. In an illustrative embodiment, the completed storage request for of one or more items can include an identification of the items for a pre-existing catalog of items provided by the server 102A via the user interface. In another embodiment, the completed storage request can include information provided by the client device 108 via the user interface to identify a target set of items. Additionally, the completed storage request for one or more items can include an associated user ID 138 and/or storage code 140. In one aspect, the unique user ID can be a combination of the user's name and other user information, such as birth date or Social Security Number. In another exemplary embodiment, a unique user ID is assigned by the server 102 to the user 110 based on a login name previously assigned to user 110 for logging in to the server 102. In another aspect, the unique storage codes can be provided, or otherwise generated by, the user 110/client device 108. Alternatively, the storage information management module 136 can associate a unique storage code 140 to the selected items. For example, the unique storage code 140 may be based on globally unique computer hardware identifiers, such as GUID (globally unique ID), or UUID (universally unique ID). Still further, unique storage codes can be generated by a user or correspond to user attributes.

With continued reference to block 330, the completed storage request for one or more items can include additional information 142 about the stored items. The additional information can include additional description of the items. The additional information 142 can also include special processing information, handling information, insurance assessments, emergency contact information, access rights information, security specifications and return information. The additional information 142 can also include commentary or annotations that may facilitate further review or access (as will be described below). At block 340, the database interface module 132 generates a record of the unique storage code 140, user ID 130 and any additionally associated information provided in the completed storage request for one or more items. One skilled in the relevant art will appreciate that the additional information may be collected after storage of the item 118 and/or that the additional information may be updated/modified during the storage of the item.

At block 350, the servers 102 initiate the sending off the storage packages to the user 110 based upon the completed storage request. In one exemplary embodiment, the instructions provided by the server 102 include the transmission to the user of a confirmation code and shipping address for the secure storage space 114. For example, the server 102 may initiate the transmission of a notification, such as an email, to an address provided by the user. Additionally, the server 102 may provide shipping instructions and shipment tracking information for the items 118 to the user 110. Still further, the server 102 may initiate the generation of the specially coded shipping packages that will be mailed or delivered to the user 110. Alternatively, the server 102 may generate a graphic image or electronic document that can be printed by the client computing device 108 for inclusion in a delivered package.

Sometime thereafter, at block 360, the network interface module 132 obtains a notification that the package 112 has been received at the secure storage space 114. In an illustrative embodiment, the network interface module 132 may periodically obtain and/or transmit transit information regarding a current transit status of items for storage at the secured storage space 114. For example, the network interface module 132 may communicate with various transportation companies/services to obtain a current transit status (e.g., current location, estimated time of arrival, etc.) of a package in transit. In another embodiment, the notification that the package 112 has been received may also include additional information regarding the processing of the package at the secured storage space 114. In one aspect, the additional information regarding the processing of the package can correspond to a review of the item (e.g., identification information, condition assessment, pictures, etc.) after it has been removed from the package. In another aspect, the additional information regarding the processing of the package at the secured storage space 114 can correspond to a confirmation of the processing of the package 112. For example, a user 110 may specify for the package 112 to be stored in a bonded portion of the secured storage space 114, to be held for customs processing, or for the package 112 to be stored in a specified conditions (e.g., temperature, lighting, humidity, etc.). The additional information can be then transmitted or otherwise be made available to the user 110. At block 370, the routine 300 terminates.

FIG. 4 is a flow diagram of an exemplary routine 400 implemented by a server 102 corresponding to a storage management service provided over a network to process a request for retrieval of an item from storage. At block 410, the network interface module 132 of the server 102 obtains a request for retrieval of an item. In an illustrative embodiment, the request for retrieval of an item can include a unique user ID from the user 110. At block 420, the server 102 provides a list of unique storage codes associated with the user ID. As discussed above with respect to FIG. 2, the user 110 uses the user interface 202 to view one or more storage codes associated with the user ID. In an illustrative embodiment, one option provided by the user interface 202 can be for the retrieval of selected items 118. At block 430, the server 102 obtains the selection of one or more stored items indicated by the user 110. At block 440, items 118 associated with the selected storage packages 112 indicated by the user 110 are shipped to the user 110. At block 450, the routine 400 terminates.

FIG. 5 is a flow diagram of an exemplary routine 500 implemented by a server 102 corresponding to a storage management service provided over a network for processing an item manipulation request. One skilled in the relevant art will appreciate that routine 500 may be implemented prior to receipt of items 118 for storage, upon receipt of items for storage or throughout a time when an item is stored. At block 510, the network interface module 132 of the server 102 obtains a stored item view/stored item manipulation request from a client device 108. In an illustrative embodiment, the stored item view/stored item manipulation request can include a unique user ID from the user 110. At block 520, the server 102 provides a list of unique storage codes associated with the user ID. As discussed above with respect to FIG. 2, the user 110 uses the user interface 202 to select one or more storage codes for which to receive status and other information. In an illustrative embodiment, the listing of the stored items may be further enhanced by the incorporation of additional security measures, such as passwords, PINs, secret questions, etc. Additionally, the listing of stored items may also be tied to specific computing devices 108 and/or within user specified viewing windows. For example, users can specify that items may only be displayed to registered computing devices (e.g., identified by I.P. address or MAC address). Additionally, users can specify that item viewing may only be enabled during specified hours to prevent unauthorized viewing.

At block 530, the server 102 displays the information about the selected storage package codes received from the user 110. In one aspect, the information displayed to the user can include the identification of the secured storage code, user provided descriptions of the items, service provider provided descriptions of the items, and/or third party information regarding the items. The information displayed to the user can also include transactional or audit information related to the storage, management or services associated with the item. The information displayed to the user can also include graphics or pictures of the item. In one aspect, the secured storage site may generate images of the stored items (e.g., a picture/video of your precious items). The information can also include additional graphic images that allow users to remotely manipulate the item. For example, a user can be presented with a three-dimensional model that can be translated into commands for physically manipulating the stored item. Still further, the information can include annotations or comments previously provided by the user or other users given access to the stored items.

In a further aspect, the information displayed to the user can include the identification of one more services available of for the identified stored items. In one embodiment, the services available for the stored items can correspond to service associated with the manipulation or modification of the stored items. Examples include, are not limited to, cleaning or repairing the stored items, reproducing or enhancing the stored items, sampling, digitizing or converting the stored items, adding, extracting or removing portions to the stored items.

In another embodiment, the services available for the stored items can correspond to services related to the stored items. Example include, but are not limited to, valuation or appraisal of the stored items, insuring the stored items, collecting additional information for the stored items, generating images of the stored items (e.g., video or still images), publishing aspects of the stored items, authenticating or verifying the status or origin of the stored items and the like.

In a further embodiment, the services available for the stored items can corresponds to enhanced commercial services based upon the stored items. Examples include, but are not limited to, offering the items for sale, searching published auction information for potential buyers, offering recommendations for additional purchase based on the stored items, offering recommendations for accessories related to the stored item, offering replacements or better conditioned substitutes for the stored item, providing the identification of the stored items as part of a user profile for other services (e.g., general user profiles), dynamically valuing one or more stored items based on current information, and the like.

At block 540, the server 102 obtains a selection of services applicable to items 118 as indicated by the user 110. Depending on the information displayed, the user may be presented with various navigation and/or manipulation options. Further, the use may be presented with a timing based function that allows for the selection of one or more services that will be implemented at a later specified time. At block 550, the routine 500 terminates.

While illustrative embodiments have been described, it will be appreciated that various changes can be made therein without departing from the spirit and scope of the invention.

The embodiments of the invention in which an exclusive property or privilege is claimed are defined as follows:

1. A computing device for managing storage of one or more items comprising:
   a processor; and
   a memory, communicatively coupled to the processor;
   wherein the computing device is configured to perform the steps comprising:
      receiving, from one or more client devices, a request for storage of an item at a secured storage site;
      receiving information about the item;
      processing the request for storage of the item from the one or more client devices, wherein processing the request for storage of the item includes associating a unique user ID corresponding to a user with a unique storage code corresponding to the item;
      identifying a replacement or a better conditioned substitute for the item based on the information about the item; and
      generating and displaying a list of user selectable services associated with the storage of the item at the secured storage site, wherein the list of the user selectable services includes offering the replacement or the better conditioned substitute for the item.

2. The computing device for managing the storage of the one or more items as recited in claim 1, wherein the request for storage of the item includes the unique user ID.

3. The computing device for managing the storage of the one or more items as recited in claim 1, wherein the request for storage of the item includes the unique storage code.

4. The computing device for managing the storage of the one or more items as recited in claim 1, wherein the computing device is further configured to generate the unique storage code.

5. The computing device for managing the storage of the one or more items as recited in claim 1, wherein the computing device is further configured to transmit a confirmation code upon receipt of the item for storage at the secured storage site.

6. The computing device for managing the storage of the one or more items as recited in claim 1, wherein the computing device is further configured to transmit information regarding a status of the item for storage at the secured storage site.

7. The computing device for managing the storage of the one or more items as recited in claim 6, wherein the information regarding the status of the item for storage includes transit information.

8. The computing device for managing the storage of the one or more items as recited in claim 6, wherein the information regarding the status of the item for storage includes information regarding processing of a package used to ship the item to the secured storage site.

9. The computing device for managing the storage of the one or more items as recited in claim 1, wherein the list of the user selectable services associated with the storage of the item at the secured storage site includes services associated with a manipulation or a modification of items delivered to the secured storage site.

10. The computing device for managing the storage of the one or more items as recited in claim 9, wherein the services associated with the manipulation or the modification of the items delivered to the secured storage site include repairing the items delivered to the secured storage site.

11. The computing device for managing the storage of the one or more items as recited in claim 1, wherein the user selectable services further include an appraisal of the item.

12. The computing device for managing the storage of the one or more items as recited in claim 1, wherein the computing device is further configured to distribute additional information about items delivered to the secured storage site.

13. The computing device for managing the storage of the one or more items as recited in claim 12, wherein the additional information corresponds to a current status of the item.

14. The computing device of claim 1, wherein the item is a physical object.

15. A non-transitory computer-readable medium having computer executable modules for managing storage, the computer executable modules comprising:
   a module configured to receive information about an item;
   a module configured to perform the steps comprising:
      identifying a replacement or a better conditioned substitute for the item based on the information about the item; and
      generating and displaying, to a user of a client computing device, a list of user selectable services associated with storage of the item at a secured storage site, wherein the list of the user selectable services includes offering the replacement or the better conditioned substitute for the item;
   a network interface module configured to send and receive storage-related information over a computer network;
   a data store interface module configured to use a data store to store and retrieve the information about the item; and
   a storage information management module configured to associate a unique user ID with a unique storage code, the unique user ID being associated with the user and the unique storage code being associated with the item.

16. The non-transitory computer-readable medium having computer executable modules for managing storage as recited in claim 15, wherein the storage-related information sent and received by the network interface module includes the unique user ID.

17. The non-transitory computer-readable medium having computer executable modules for managing storage as recited in claim 15, wherein the storage-related information sent and received by the network interface module includes the unique storage code.

18. The non-transitory computer-readable medium having computer executable modules for managing storage as recited in claim 15, wherein the storage-related information sent and received by the network interface module includes a description of the item.

19. The non-transitory computer-readable medium having computer executable modules for managing storage as recited in claim 15, wherein the storage information management module is further configured to generate a storage confirmation code upon receipt of the item for storage at the secured storage site.

20. The non-transitory computer-readable medium having computer executable modules for managing storage as recited in claim 15, wherein the storage information management module is further configured to generate the unique storage code.

21. The non-transitory computer-readable medium having computer executable modules for managing storage as recited in claim 15, wherein the list of the user selectable services related to the item include services associated with a manipulation or a modification of items delivered for storage to the secured storage site.

22. The non-transitory computer-readable medium having computer executable modules for managing storage as recited in claim 21, wherein the manipulation or the modification of the items delivered for storage to the secured storage site includes an extraction of content associated with the items delivered for storage to the secured storage site.

23. The non-transitory computer-readable medium having computer executable modules for managing storage as recited in claim 15, wherein the list of the user selectable services related to the item includes a publication of the item.

24. A computer-assisted method for managing storage, the computer-assisted method comprising:
  obtaining a storage request from a client computing device;
  receiving information about an item associated with a user of the client computing device; and
  performing, by a responsive computing device, the steps comprising:
    identifying a replacement or a better conditioned substitute for the item based on the information about the item; and
    generating and displaying a list of user selectable services associated with storage of the item at a secured storage site, wherein the list of the user selectable services includes offering the replacement or the better conditioned substitute for the item;
  wherein in response to the obtaining the storage request, the responsive computing device performs the steps of:
    obtaining a unique user ID associated with the user of the client computing device;
    obtaining a unique storage code used to identify the item associated with the user; and
    associating the unique user ID with the unique storage code.

25. The computer-assisted method for managing storage as recited in claim 24, wherein obtaining the storage request includes obtaining the unique user ID from the client computing device.

26. The computer-assisted method for managing storage as recited in claim 24, wherein obtaining the storage request includes obtaining the unique storage code from the client computing device.

27. The computer-assisted method for managing storage as recited in claim 24, wherein obtaining the unique storage code to identify the item associated with the user includes generating the unique storage code.

28. The computer-assisted method for managing storage as recited in claim 24, wherein the list of the user selectable services for the item includes services associated with a manipulation or a modification of the item associated with the user.

29. The computer-assisted method for managing storage as recited in claim 28, wherein the list of the user selectable services associated with the manipulation or the modification of the item associated with the user includes repairing the item associated with the user.

30. The computer-assisted method for managing storage as recited in claim 24, wherein the list of the user selectable services related to items delivered for storage to the secured storage site includes collecting additional information related to the item associated with the user.

31. The computer-assisted method for managing storage as recited in claim 24, further comprising providing information regarding a status of the item.

32. The computer-assisted method for managing storage as recited in claim 31, wherein the status corresponds to a transit status of the item.

33. A non-transitory computer-accessible medium having instructions encoded thereon that is used for storage, wherein the instructions, when executed by a computing device, cause the computing device to perform steps comprising:
  receiving information about an item;
  obtaining a unique storage code associated with the item after the item has been stored;
  identifying a replacement or a better conditioned substitute for the item based on the information about the item;
  generating and displaying a list of user selectable services associated with storage of the item at a secured storage site, wherein the list of the user selectable services includes offering the replacement or the better conditioned substitute for the item;
  obtaining a selection of one or more of the user selectable services from the list of the user selectable services for the stored item; and
  initiating an implementation of the selection of the one or more of the user selectable services for the stored item.

34. The non-transitory computer-accessible medium having the instructions encoded thereon that is used for storage as recited in claim 33, wherein the one or more of the user selectable services for the item correspond to a manipulation or a modification of the stored item.

35. The non-transitory computer-accessible medium having the instructions encoded thereon that is used for storage as recited in claim 34, wherein the one or more of the user selectable services that correspond to the manipulation or the modification of the stored item include cleaning the stored item.

36. The non-transitory computer-accessible medium having the instructions encoded thereon that is used for storage as recited in claim 33, wherein the list of the one or more of the user selectable services for the stored item includes services provided at the secured storage site for the stored item.

37. The non-transitory computer-accessible medium having the instructions encoded thereon that is used for storage as recited in claim 36, wherein the list of the one or more of the user selectable services for the stored item includes generating images of the stored item.

38. The non-transitory computer-accessible medium having the instructions encoded thereon that is used for storage as recited in claim 33, wherein the user selectable services associated with the stored item further include a dynamic valuation of the stored item.

* * * * *